US009645840B2

(12) United States Patent
Ennaji et al.

(10) Patent No.: US 9,645,840 B2
(45) Date of Patent: May 9, 2017

(54) USER-DEFINED POOLS

(71) Applicant: Amazon Technologies, Inc., Reno, NV (US)

(72) Inventors: Rachid Ennaji, Seattle, WA (US); Jin Seop Kim, Seattle, WA (US); Brian Helfrich, Seattle, WA (US); David John Ward, Jr., Seattle, WA (US); Stephen Alden Elliott, Seattle, WA (US); Peng Zhai, Bellevue, WA (US); Dhanvi Harsha Kapila, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 286 days.

(21) Appl. No.: 13/855,449

(22) Filed: Apr. 2, 2013

(65) Prior Publication Data
US 2014/0297866 A1 Oct. 2, 2014

(51) Int. Cl.
*G06F 15/173* (2006.01)
*G06F 9/455* (2006.01)
*G06Q 10/06* (2012.01)
*G06Q 30/08* (2012.01)
*G06F 9/50* (2006.01)
*H04L 29/08* (2006.01)

(52) U.S. Cl.
CPC ............ *G06F 9/45533* (2013.01); *G06F 9/50* (2013.01); *G06Q 10/06* (2013.01); *G06Q 30/08* (2013.01); *H04L 67/1097* (2013.01)

(58) Field of Classification Search
CPC ........... G06Q 30/08; G06Q 10/06; G06F 9/50

USPC ........................................................ 709/226
See application file for complete search history.

(56) References Cited

U.S. PATENT DOCUMENTS

| 7,877,754 | B2 | 1/2011 | Birkestrand et al. |
| 2003/0069828 | A1 | 4/2003 | Blazey et al. |
| 2004/0010592 | A1 | 1/2004 | Carver et al. |
| 2008/0080396 | A1* | 4/2008 | Meijer et al. ................ 370/254 |
| 2008/0148342 | A1 | 6/2008 | Aiyagari et al. |
| 2008/0189192 | A1* | 8/2008 | Ronen .................... G06Q 30/04 709/239 |
| 2009/0164635 | A1* | 6/2009 | Denker et al. ............... 709/226 |
| 2009/0265205 | A1* | 10/2009 | Stinchcombe et al. .......... 705/8 |
| 2009/0327911 | A1 | 12/2009 | Ningune et al. |
| 2010/0223386 | A1* | 9/2010 | Kokusho et al. ............ 709/226 |
| 2011/0173637 | A1 | 7/2011 | Brandwine et al. |
| 2011/0213669 | A1* | 9/2011 | Vojnovic et al. .......... 705/14.71 |
| 2012/0215598 | A1 | 8/2012 | Georgis et al. |
| 2012/0239739 | A1 | 9/2012 | Manglik et al. |
| 2012/0265881 | A1 | 10/2012 | Chen et al. |
| 2012/0281641 | A1 | 11/2012 | Cui et al. |

(Continued)

OTHER PUBLICATIONS

U.S. Appl. No. 13/855,498, filed Apr. 2, 2013, Ennaji et al.
(Continued)

*Primary Examiner* — Wing F Chan
*Assistant Examiner* — Joseph Maniwang
(74) *Attorney, Agent, or Firm* — Baker & Hostetler LLP

(57) ABSTRACT

One or more resource slots are allocated to a customer according to a first set of pricing policies. The customer is allowed to identify at least one of the resource slots and identify other users allowed to access the identified resource slots according to a second pricing policy, the second pricing policy being designated by the customer.

25 Claims, 15 Drawing Sheets

(56) References Cited

U.S. PATENT DOCUMENTS

| | | |
|---|---|---|
| 2012/0290460 A1* | 11/2012 | Curry et al. ............... 705/37 |
| 2013/0111027 A1* | 5/2013 | Milojicic ............ G06F 9/5077 709/225 |
| 2013/0179574 A1* | 7/2013 | Calder et al. ............. 709/226 |
| 2013/0204700 A1 | 8/2013 | Synett et al. |
| 2014/0101005 A1* | 4/2014 | Baset ................ G06Q 10/10 705/30 |
| 2014/0236745 A1 | 8/2014 | Vautour |
| 2014/0280185 A1 | 9/2014 | Nordstrom |
| 2014/0280948 A1* | 9/2014 | Schmidt ............. H04L 47/827 709/226 |
| 2015/0242200 A1 | 8/2015 | Niemoeller et al. |

OTHER PUBLICATIONS

U.S. Appl. No. 13/855,518, filed Apr. 2, 2013, Ennaji et al.
European Patent Application No. 14779020.8; Extended Search Report; dated Oct. 6, 2016; 10 pages.
Singapore Patent Application No. 11201508211T; Written Opinion; dated Sep. 5, 2016; 4 pages.

* cited by examiner

USER-DEFINED POOLS

CROSS REFERENCE TO RELATED APPLICATIONS

This application is related by subject matter to that which is disclosed in the following commonly assigned applications: U.S. patent application Ser. No. 13/855,498, entitled "CAPACITY MERGING FOR USER-DEFINED POOLS" and U.S. patent application Ser. No. 13/855,518, entitled "BURST CAPACITY FOR USER-DEFINED POOLS," all filed on Apr. 2, 2013, the entirety of each application hereby incorporated by reference.

BACKGROUND

A data center is a facility that houses computer systems and various networking, storage and other related components. Data centers may, for example, provide computing services to businesses and individuals as a remote computing service or provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage and/or other network-accessible resources may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may be run on directly on a physical server hardware platform, within a virtual machine or some combination of the two. Various types and configurations of instances may be made available, including different sizes of resources executing different operating systems (OS) and/or hypervisors and with various installed software applications, runtimes and the like.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

A provider network such as a network implemented across one or more data centers may offer computing resources such as reserved instances and spot instances. A reserved instance may provide a customer with the ability to reserve a number of a specific type and configuration of an instance for a fixed term, such as one year or three years. A spot instance may refer to an allocation of an instance using a spot-price policy, where a customer may specify the maximum price per unit of time that the customer is willing to pay to run the instance. If the customer's maximum price exceeds a dynamic spot price determined at least in part by supply and demand, then the instance may be run for the customer. Other types of instances may be offered by the provider network.

In various embodiments described further in this disclosure, customers may be provided with the ability to create a private marketplace that operates to offer a customer-defined set of the customer's instances to a selected group of users according to a bidding or pricing policy that, in some cases, may be similar to a spot instance policy. For example, an organization such as a university may have a set of reserved instances that are offered via a private marketplace that allows users to bid for the reserved instances. In this example, the university may offer the customer-defined set of instances to departments within the university. Individuals or computers within the departments can bid internally for the reserved instances. In one example, the departments can bid a price or use a defined set of "currency" or bidding credits. In addition to the currency or bidding credits, the university may also be able to customize aspects such as the minimum and maximum prices, the bidding/pricing algorithm, interruption cycles and other parameters that may be applicable to resource types, such as spot instances. The university may also be able to select other types of instances for the private marketplace, such as allocated spot instances and on-demand instances (further described below). By providing the ability to create a private marketplace, customers can more efficiently distribute its computing capacity to its internal users. This can decrease costs for the customer who may need less reserved capacity when the capacity is distributed in this manner, and the provider network can increase utilization of its spare capacity. Additional embodiments of a private marketplace are further described below. In various embodiments described herein, the private marketplace may be referred to as a private marketplace, limited marketplace, user-defined pool, user-defined market, private spot market or user-defined spot market.

Figure 1:
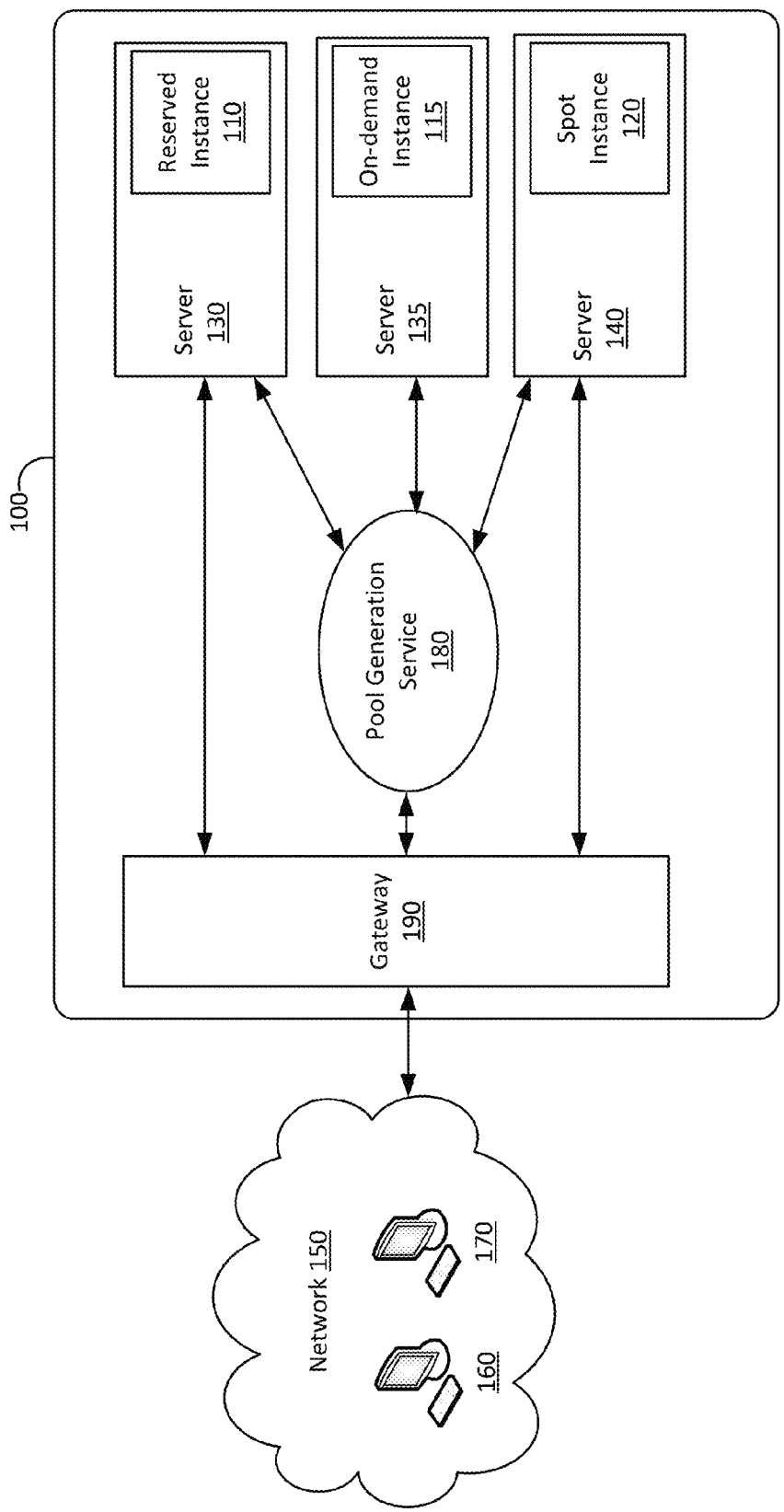
FIG. 1 is a diagram illustrating a mechanism for pooling instances in accordance with the present disclosure.

FIG. 1 is a diagram illustrating a system 100 including a mechanism for providing user-defined pools in accordance with the present disclosure. In FIG. 1, system 100 may include a reserved virtual machine instance 110, an on-demand virtual machine instance 115 and a spot virtual machine instance 120 that may execute, for example, on one or more server computers 130, 135 and 140, respectively. It will be appreciated that some embodiments may involve additional virtual machine instances of various types that may be instantiated on additional server computers.

FIG. 1 also illustrates a public network 150 that may include one or more computers such as computers 160 and 170. According to one embodiment, instances 110, 115 and 120 may be configured to provide computing services to a computer user (not shown) of public network 150 via gateway 190 and computers 160 and 170. For example, reserved virtual machine instance 110 may provide a set of remote access enterprise applications to a group of users who may, for example, be employees of a university or other educational institution.

A user at computer 160 or 170 may send a request to a user-defined pool generation service 180 for creation of a user-defined pool or private marketplace. In some embodiments, server 130 or 140 may send the request on behalf of a user, on behalf of itself or on behalf of other servers. In response to the request for the instance, user-defined pool generation service 180 may log the request and periodically provide updates as to the status of the request. The user-defined pool generation service 180 may communicate with other services to facilitate creation of the requested private marketplace. The user-defined pool generation service 180 may, for example, determine what instances are associated with the user and provide an interface for facilitating selection of the user's instances, selection of who may request or bid for the selected instances, and selection of a pricing or bidding policy. The user-defined pool generation service 180 may further provide notifications to the user when the private marketplace goes online.

Various aspects of the disclosure are now described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity such as a company or organization to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 2:
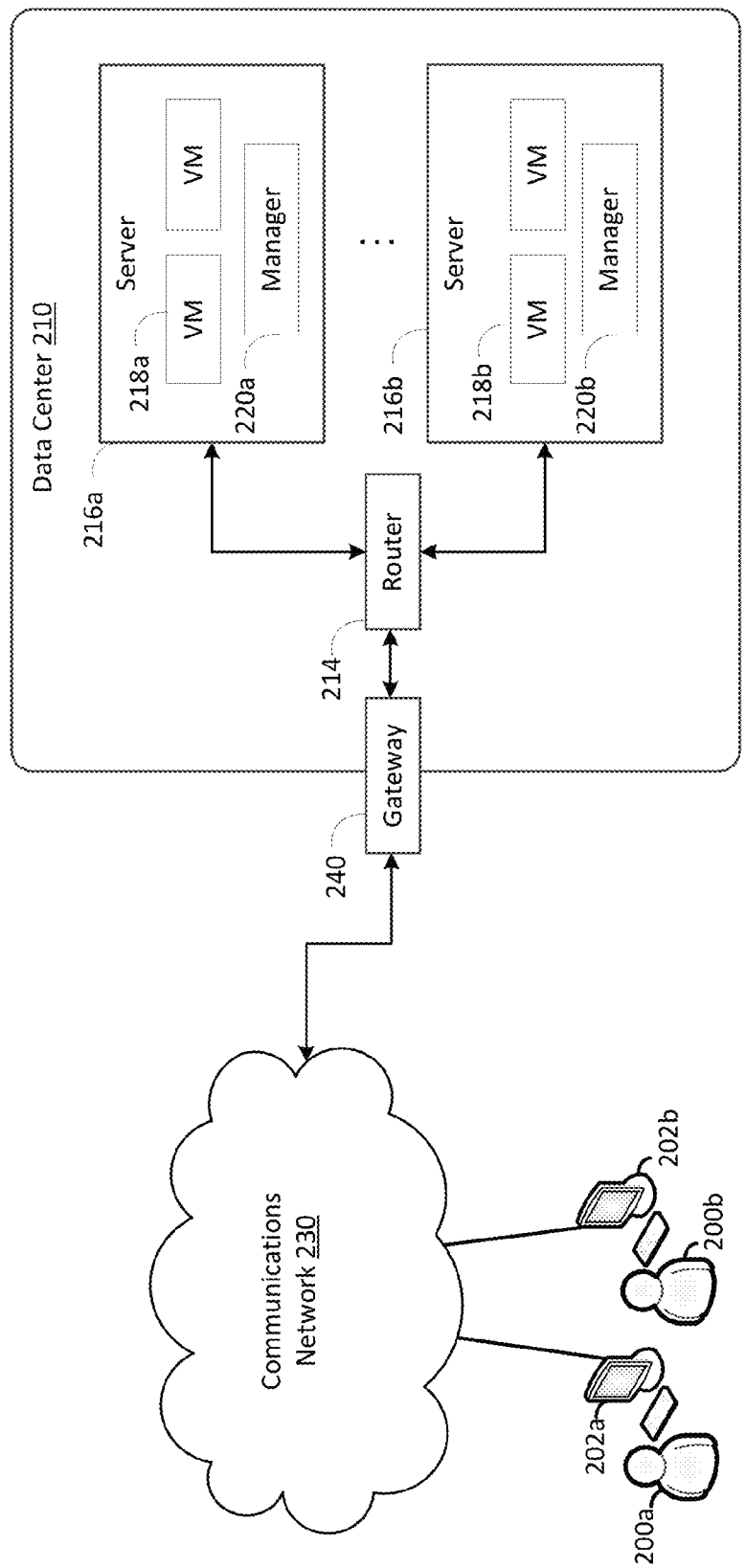
FIG. 2 is a diagram illustrating an example computing system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general-purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218a and 218b (which may be referred herein singularly as "a virtual machine instance 218" or in the plural as "the virtual machine instances 218"). The virtual machine instances 218 may be configured to execute applications, including Web servers, application servers, media servers, database servers and the like. Other resources that may be provided include data storage resources (not shown) and may include file storage devices, block storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communication network 230 may provide access to computers 202. Computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

Computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on servers 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices in this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of the purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared and other types of information. The deployment component utilizes the customer-provided configuration and cache warming logic to launch, configure and prime new instances of computing resources.

Figure 3:
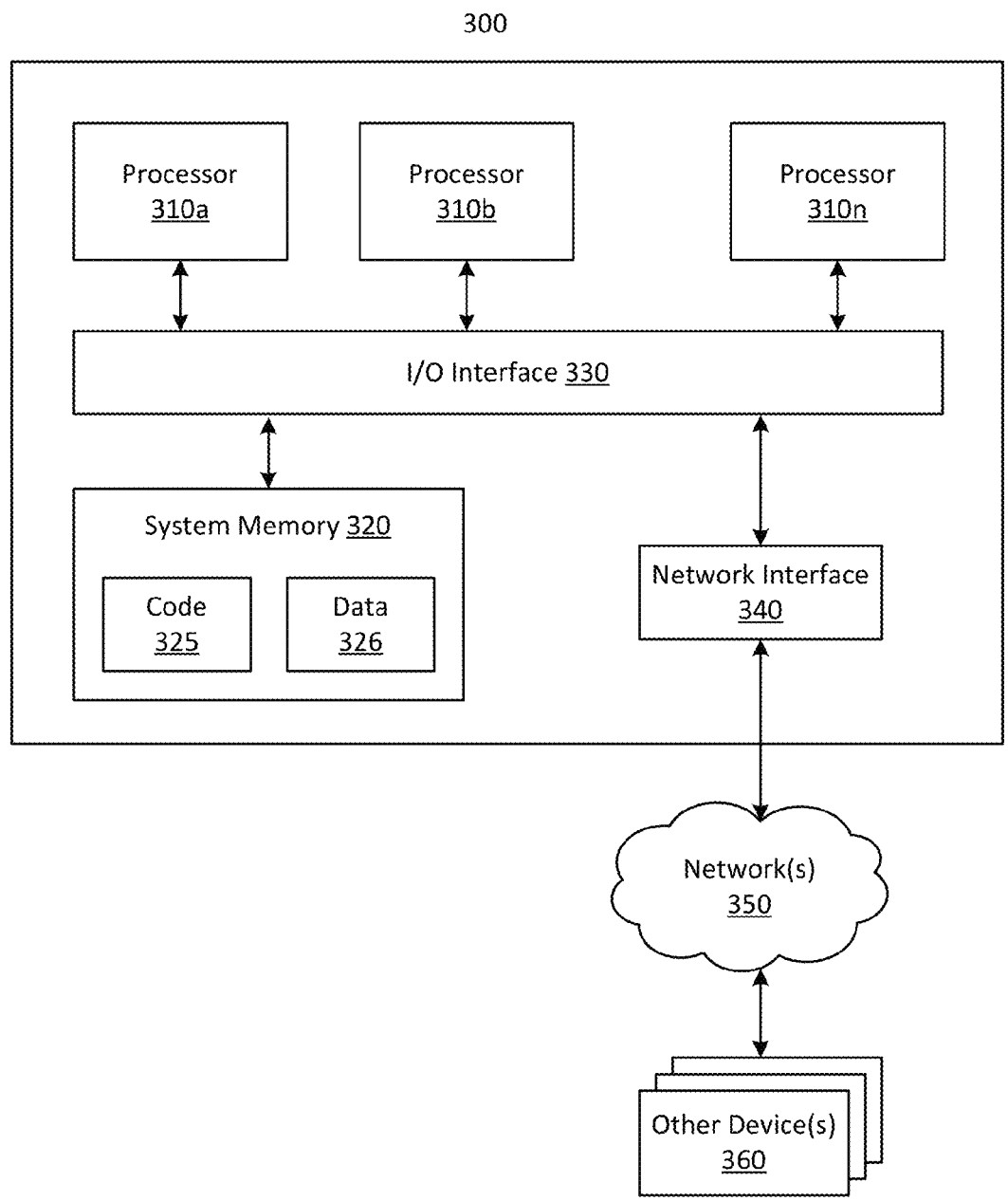
FIG. 3 is a diagram illustrating an example computing system that may be used in some embodiments.

In at least some embodiments, a server that implements a portion or all of one or more of the technologies described herein, including the techniques to implement the functionality of a pool generation service 180 may include a general-purpose computer system that includes or is configured to access one or more computer-accessible media. FIG. 3 illustrates such a general purpose computing device 300. In the illustrated embodiment, computing device 300 includes one or more processors 310a, 310b and/or 310n (which may be referred herein singularly as "a processor 310" or in the plural as "the processors 310") coupled to a system memory 320 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight or another suitable number). Processors 310 may be any suitable processors capable of executing instructions. For example, in various embodiments, processors 310 may be general-purpose or embedded processors implementing any of a variety of instruction set architectures (ISAs), such as the x86, PowerPC, SPARC or MIPS ISAs or any other suitable ISA. In multiprocessor systems, each of processors 310 may commonly, but not necessarily, implement the same ISA.

System memory 320 may be configured to store instructions and data accessible by processor(s) 310. In various embodiments, system memory 320 may be implemented using any suitable memory technology, such as static random access memory (SRAM), synchronous dynamic RAM (SDRAM), nonvolatile/Flash™-type memory or any other type of memory. In the illustrated embodiment, program instructions and data implementing one or more desired functions, such as those methods, techniques and data described above, are shown stored within system memory 320 as code 325 and data 326.

In one embodiment, I/O interface 330 may be configured to coordinate I/O traffic between processor 310, system memory 320 and any peripheral devices in the device, including network interface 340 or other peripheral interfaces. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computing device 300 and other device or devices 360 attached to a network or networks 350, such as other computer systems or devices as illustrated in FIGS. 1 through 3, for example. In various embodiments, network interface 340 may support communication via any suitable wired or wireless general data networks, such as types of Ethernet networks, for example. Additionally, network interface 340 may support communication via telecommunications/telephony networks such as analog voice networks or digital fiber communications networks, via storage area networks such as Fibre Channel SANs or via any other suitable type of network and/or protocol.

In some embodiments, system memory 320 may be one embodiment of a computer-accessible medium configured to store program instructions and data as described above for FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 300 via I/O interface 330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 300 as system memory 320 or another type of memory. Further, a computer-accessible medium may include transmission media or signals such as electrical, electromagnetic or digital signals, conveyed via a communication medium such as a network and/or a wireless link, such as may be implemented via network interface 340. Portions or all of multiple computing devices such as those illustrated in FIG. 3 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A network set up by an entity such as a company or a public sector organization to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type and/or configuration of computing resource in a specific availability zone for a longer period than desired. If the technical architecture or needs of the application change, the customer may not be able to realize a return on their investment in the reserved instances.

Operators of such provider networks may in some instances implement a flexible set of resource reservation, control and access interfaces for their clients. For example, a resource manager of the provider network may implement a programmatic resource reservation interface (e.g., via a Web site or a set of Web pages) that allows clients to learn about, select, purchase access to and/or reserve resource instances. In some embodiments discussed below where an entity such as a resource manager or a pricing optimizer is described as implementing one or more programmatic interfaces such as a Web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models and so on.

The provider network may support several different purchasing modes (which may also be referred to herein as reservation modes) corresponding to some of the instance types described above. For example, the provider network may support long-term reservations, on-demand resource allocations or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price-per-unit time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Utilizing the technologies described herein, a provider network may also implement a service to allow for creation of a private marketplace. The service may provide a mechanism for customers who would like to offer their reserved instances and other types of instances to users associated with the customer or otherwise designated by the customer. For example, the customer's internal users within their organizations may want to obtain shorter-term reserved instances than those generally provided by the computing resource provider, or only need access to an instance for a limited duration. A customer may select the remainder of the term of their reserved instances, a number of unused reserved instances and allocated spot instances, or a portion thereof, and offer the selected instances to the customer's internal users in the private marketplace, allowing the internal users to "purchase," "bid for" or otherwise request access to instances via the private marketplace. Customers may thus be provided with a method of more efficiently utilizing its acquired instances by implementing such a limited private marketplace for providing the instances to those internal users who most need or are willing to pay the most "currency" for the instances, thus more efficiently distributing the customer's allocated capacity.

Figure 4:
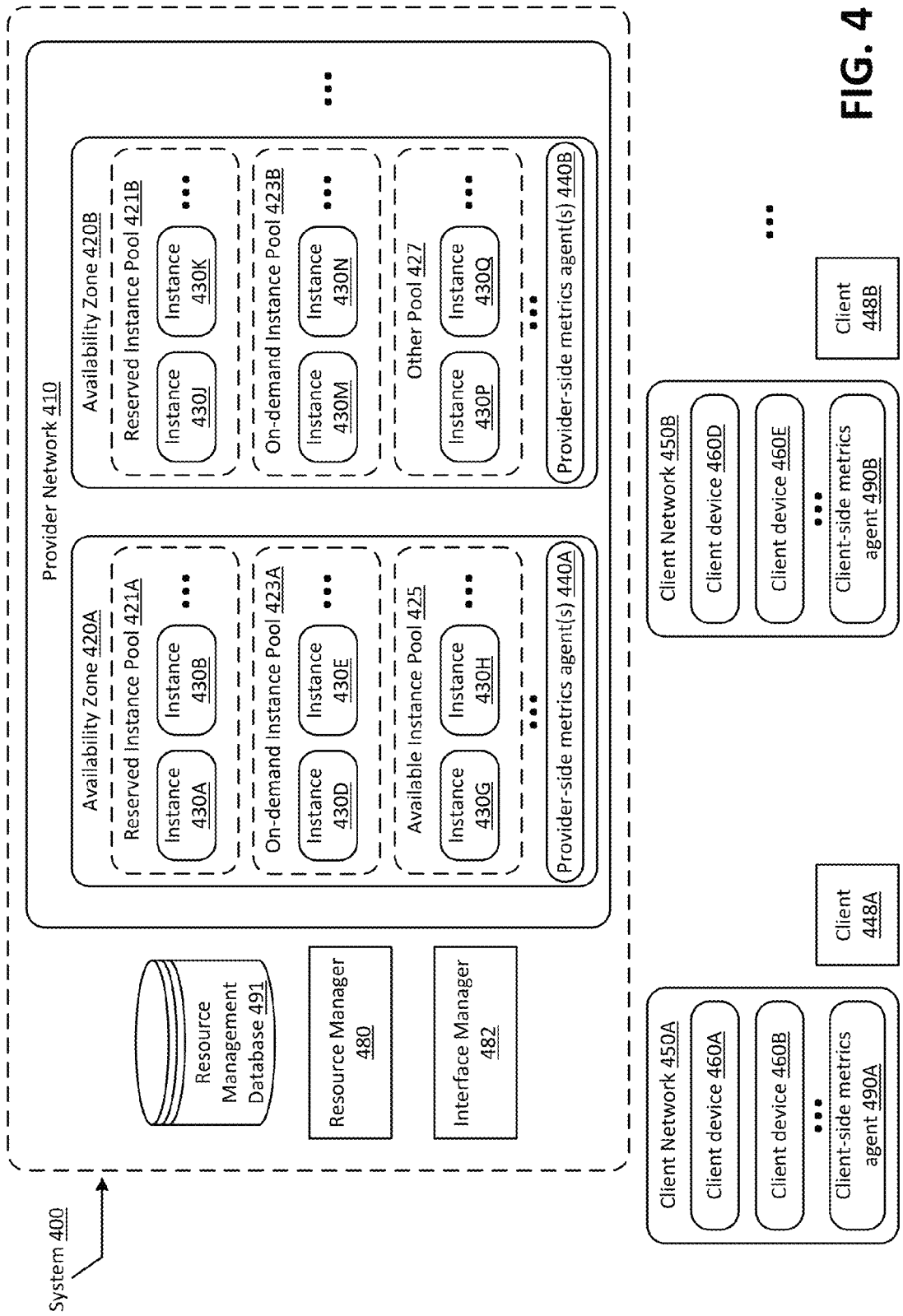
FIG. 4 is a diagram illustrating a system for pooling instances in accordance with the present disclosure.

FIG. 4 illustrates an example system environment for providing instances, according to at least some embodiments. The system 400 may include a provider network 410 comprising a plurality of resource instances 430 (which may be referred herein singularly as "a resource instance 430" or in the plural as "the resource instances 430"), such as instances 430A, 430B, 430D, 430E, 430G and 430H in one availability zone 420A and instances 430J, 430K, 430M, 430N, 430P, 430Q in a different availability zone 420B. The various resource instances 430 in the availability zones 420A and 420B (which may be referred herein singularly as "an availability zone 420" or in the plural as "the availability zones 420") may be reserved and/or allocated for use by clients (or potential clients) such as client 448A and 448B (which may be referred herein singularly as "a client 448" or in the plural as "the clients 448"). In the illustrated embodiment, system 400 includes a resource manager 480 and an interface manager 482. As noted earlier, in some embodiments the functionality of the interface manager 482 may be implemented by a subcomponent of the resource manager 480.

The interface manager 482 may in some embodiments implement one or more programmatic interfaces allowing clients 448 to search for, browse, reserve and acquire instances 430 to obtain various types of services, e.g., to run and/or access various applications. In the illustrated embodiment, at a given point in time, some or all of the instances 430 may be assigned to instance pools, such as reserved instance pools 421A or 421B, on-demand instance pools 423A or 423B, available instance pool 425 or other pools such as other pool 427.

In some embodiments a given pool such as available instance pool 425 may itself contain its own sub-pools, e.g., based on the modes of instance reservation and allocation supported. Each pool (or sub-pool) may have an associated pricing policy for its instances, as well as other properties such as interruptibility settings for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 430 illustrated in FIG. 4 are shown as belonging to availability zones 420, in other embodiments the provider network 410 may be organized differently, e.g., in some embodiments availability zones 420 may not be implemented. Availability zones 420 may be grouped into geographic regions (not shown in FIG. 4) in some embodiments. Instance pools may be implemented within availability zones in some implementations (e.g., each availability zone may have its own reserved instance pool); while in other implementations an instance pool or sub-pool may span multiple availability zones.

Figure 5:
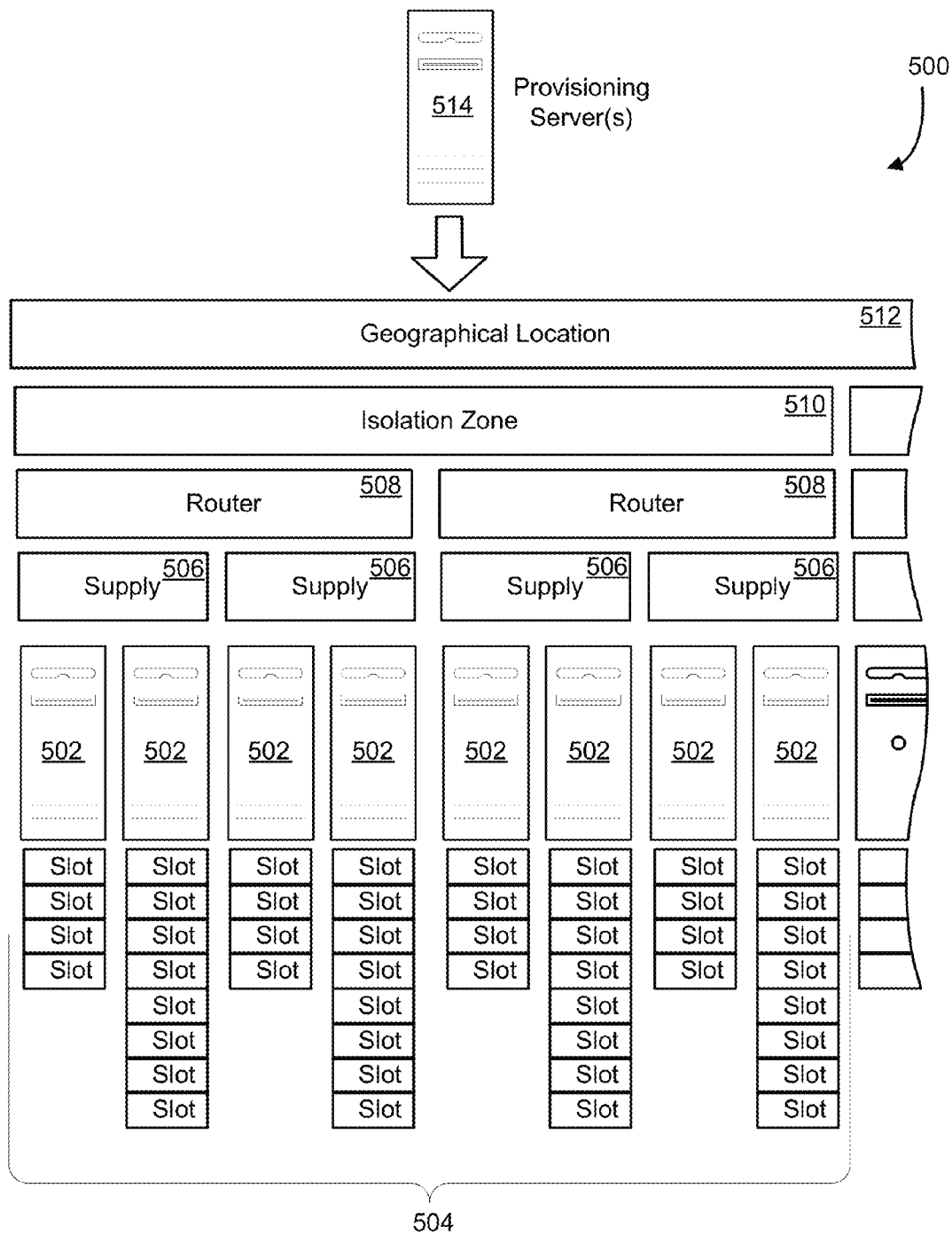
FIG. 5 is a diagram illustrating a mechanism for pooling instances in accordance with the present disclosure.

In some embodiments, such as in FIG. 5, a data center 500 may be viewed as a collection of shared computing resources and/or shared infrastructure. For example, as shown in FIG. 5, a data center 500 may include virtual machine slots 504, physical hosts 502, power supplies 506, routers 508, isolation zones 510 and geographical locations 512. A virtual machine slot 504 may be referred to as a slot or as a resource slot. A physical host 502 may be shared by multiple virtual machine slots 504, each slot 504 being capable of hosting a virtual machine, such as a guest domain. Multiple physical hosts 502 may share a power supply 506, such as a power supply 506 provided on a server rack. A router 508 may service multiple physical hosts 502 across several power supplies 506 to route network traffic. An isolation zone 510 may service many routers 508; the isolation zone 510 being a group of computing resources that may be serviced by redundant resources such as a backup generator. Multiple isolation zones 510 may reside at a geographical location 512, such as a data center 500. A provisioning server 514 may include a memory and processor configured with instructions to analyze user data and rank available implementation resources using determined roles and shared resources/infrastructure in the calculation. The provisioning server(s) 514 may also manage workflows for provisioning and de-provisioning computing resources as well as detecting health and/or failure of computing resources.

A provisioning server 514 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 502 that shares a router 508 with a second system may be more proximate to the second system than to a third system only sharing an isolation zone 510. Depending on an application, it may be desirable to keep the distance low to increase throughput or high to increase durability. In another embodiment, the distance may be defined in terms of unshared resources. For example, two slots 504 sharing a router 508 may have a distance of a physical host 502 and a power supply 506. Each difference in resources may be weighted differently in a distance calculation.

A placement calculation may also be used when selecting a prepared resource to transfer to a client account. In one embodiment, a client requests a virtual machine having an operating system. The provisioning server 514 may determine that the request may be satisfied with a staged volume in a slot 504. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 514 may determine that a placement near other existing volumes is desirable for latency concerns. Therefore, the decision may find that sharing a router 508 is desirable, but sharing a supply 506 and physical host 502 is undesirable. A volume in the pool may then be selected that matches these attributes and placed preferably on a same router 508 as the other volumes, but not the same physical host 502 or power supply 506. In other examples of placement decisions, such as those relating to a database shard, sharing of infrastructure may be less desirable and a volume may be selected that has less infrastructure in common with other related volumes.

Operators of provider networks such as those described above may, in some embodiments, provide an infrastructure, such as user-defined pool generation service 180 depicted in FIG. 1, that provides customers with the ability to request and create user-defined private marketplaces. In one embodiment, a customer may be an entity, such as an educational institution, that has purchased a number of resources, such as reserved instances and on-demand instances. The customer may select a subset of the customer's reserved and on-demand instances and create an internal marketplace in which departments and/or users within the educational institution may bid internally for the reserved instances and on-demand instances. The bidding process may be similar to the process for bidding for a spot instance in a spot market as described above. In some embodiments, the customer may select other bidding processes or allow for bidding using other forms of payment such as with allotted credits. In various embodiments, aspects may be customizable—such as the currency, the minimum/maximum prices or price levels, the bidding/pricing algorithm, interruption cycles and other parameters.

Figure 6:
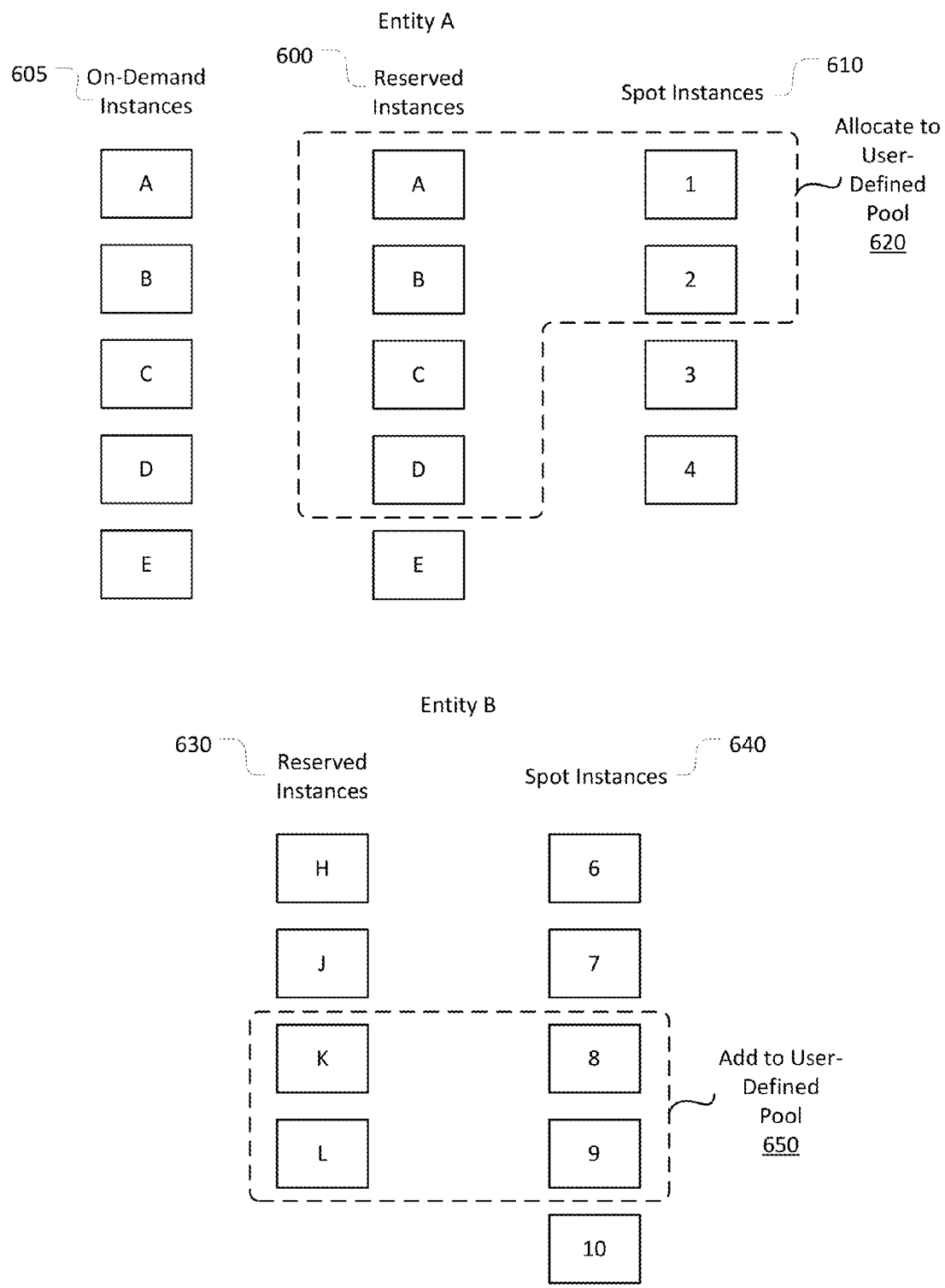
FIG. 6 is a diagram illustrating a system for pooling instances in accordance with the present disclosure.

Referring to FIG. 6, illustrated is an example of users allocating resources for a private marketplace in accordance with this disclosure. User A may have associated reserved instances 600, on-demand instances 605 and spot instances 610. User A may allocate instances A, B, C and D of user A's reserved instances 600 for user-defined pool 620. User A may also allocate instances 1 and 2 of the spot instances 600 for the user-defined pool 620. Instances A, B, C and D of user A's reserved instances 600 may be referred to as a subset of the reserved instances 600, and instances 1 and 2 of the spot instances 600 may be referred to as a subset of the spot instances 600. User B may have associated reserved instances 630 and spot instances 640. User B may allocate instances K and L of user B's reserved instances 630 for user-defined pool 650. User B may also allocate instances 8 and 9 of user B's spot instances 640 for the user-defined pool 650. Instances K and L of user B's reserved instances 630 may be referred to as a subset of the reserved instances 630, and 8 and 9 of user B's spot instances 640 may be referred to as a subset of the spot instances 640. In some embodiments, user A or user B can remove instances that have been allocated to a user-defined pool.

As discussed above, an instance may be referred to as a resource slot, a virtual machine slot or a slot. A user-defined pool or private marketplace may be provided as an additional service on top of a customer's resource slots, such as the user-defined pool generation service 180 of FIG. 1. In one embodiment, the user-defined pool generation service 180 can be embodied in software that can be installed on a network of computers, such as in a private data center.

A user may select a number of instances of each instance type that the user has obtained and has been allocated by the provider network. In one embodiment, the user may also be able to provide or select a pricing algorithm. For example, the user may be able to upload one or more algorithms or formulas using a standardized format, such as XML. In one embodiment, the pool generation service may provide one or more templates for an algorithm or formula. The pool generation service may also provide additional templates or predetermined selections for parameters such as the number and type of instances, configuring the selected instances, making selections for enforcing fairness between bidders and so on.

A number of methods can be used for allowing users to bid for instances in the private marketplace. In one embodiment, the user can be provided the option of selecting an English auction method in which ascending prices are displayed, and the winner is the highest bidder with the price for the instance being the highest bid. In another embodiment, the user may be provided an option of selecting a Dutch auction method in which the price for the instance begins at a high level and is lowered until a user accepts the current price. As noted above, the user can select a maximum price that the user is willing to pay, and if the user's maximum price exceeds a dynamic price determined at least in part by supply and demand, then the instance may be provided to the user.

In one embodiment, the user can be provided the option of selecting a currency to be used for the bidding process. The currency can include units of value that are defined or selected by the customer when the private marketplace is created. While the customer may select traditional monetary units or values for the instances such as dollars/unit of time, the customer may also select other units such as CPU cycles or network bandwidth, which may reflect value based on different bases of value. In some embodiments, the currency may be used to bid for units of computing capacity such as a resource slot or for other units of computing capacity that may be defined by the user. For example, a bid can include a monetary bid amount and an amount of desired computing capacity such as an amount of computing cycles.

In one embodiment, the user-defined pool generation service 180 can provide an API for facilitating the selection of parameters for the private marketplace. The API may determine which customer is communicating with the pool generation service and generate a request to create a private marketplace. The user-defined pool generation service 180 may assign an ID to the request and track the ID of the requested private marketplace during processing of the request.

In one embodiment, a customer that is only identified with a single authorized user (e.g., a university customer with one authorized person who can make changes to the university account with the provider network) may allow the single authorized user able to set up a private market. If there are multiple authorized persons, then the pool generation service may require that a single specialized account be identified as being able to set up a private market. The user-defined pool generation service 180 may authorize the user with the specialized account based on, for example, credentials presented by the user. The user-defined pool generation service 180 can track the private marketplace generation activities for billing purposes. The user-defined pool generation service 180 may further track which of the users who bid on the instances in the private marketplace have bid for and have been allocated instances so that the customer may track this activity. The user-defined pool generation service 180 may track the usage on a per-user basis, a per-use basis, a per-bid basis or other metering schemes, and provide the information to the customer for billing and tracking purposes.

In one embodiment, in response to a bid request, the user-defined pool generation service 180 can embed an ID for the bidding user as metadata that can be used to identify the bidding user as the bid request is processed and fulfilled. The metadata can include fields including the user ID, which can be included in the billing records. The user-defined pool generation service 180 can thus track the customer who requested the private marketplace, as well as identify users who have bid for instances in the private marketplace.

In some embodiments, key-value pairing can be used to track the data or attributes associated with the request for the private marketplace or bids for the resource slots in the private marketplace. The user-defined pool generation service 180 may track linked data records that include a unique identifier for the data as well as the data itself or a pointer to the location of the data. For example, an open-ended data structure may be used to collect the user data such as <user-defined pool ID, user ID, request ID>.

In some cases, customers may have more than one account with the provider network and thus have multiple pools of allocated resources. For example, a customer may have a first account for a first project and have associated resource slots allocated with the first account. The customer may also have a second account for a second project and have associated resource slots allocated with the second account. In one embodiment, the customer may be provided the ability to select resource slots associated with either the first or second accounts and allocate the selected resource slots for a single private marketplace. Customers may thus be able to mix and match resources from multiple pools of resources into one user-defined pool.

In some cases, two or more customers may elect to join resources and request a single private marketplace that can be accessed by users associated with the two or more customers. Thus organizations and businesses may be able to pool resources among the entities to create the private marketplace. In one embodiment, the user-defined pool generation service 180 can link together accounts of two or more customers to create a single user-defined pool. The user-defined pool generation service 180 may also track usage based on actual usage of the resources and by tracking the users who bid for the resources and their affiliations with the customers. The single user-defined pool may be updated by a single customer who is authorized to make changes to the single user-defined pool. Alternatively, additional customers may be authorized to make changes to the single user-defined pool. Similarly, a single customer may be authorized to make changes to policies associated with the single user-defined pool. Alternatively, additional customers may be authorized to make changes to policies associated with the single user-defined pool.

In one embodiment, the functionality of the user-defined pool generation service 180 may be provided via software that can be installed and executed on a customer's computing resources. For example, the customer may own and/or operate their own computing infrastructure and configure their computing resources as a plurality of resource slots configured to host computing instances. The pool generation service software may provide interfaces for selecting the customer's resource slots, selecting parameters for a user-selected pool as described above and create the user-selected pool. The pool generation service software may further facilitate the requests/bids for the resource slots and track usage information for tracking/billing purposes.

Figure 7:
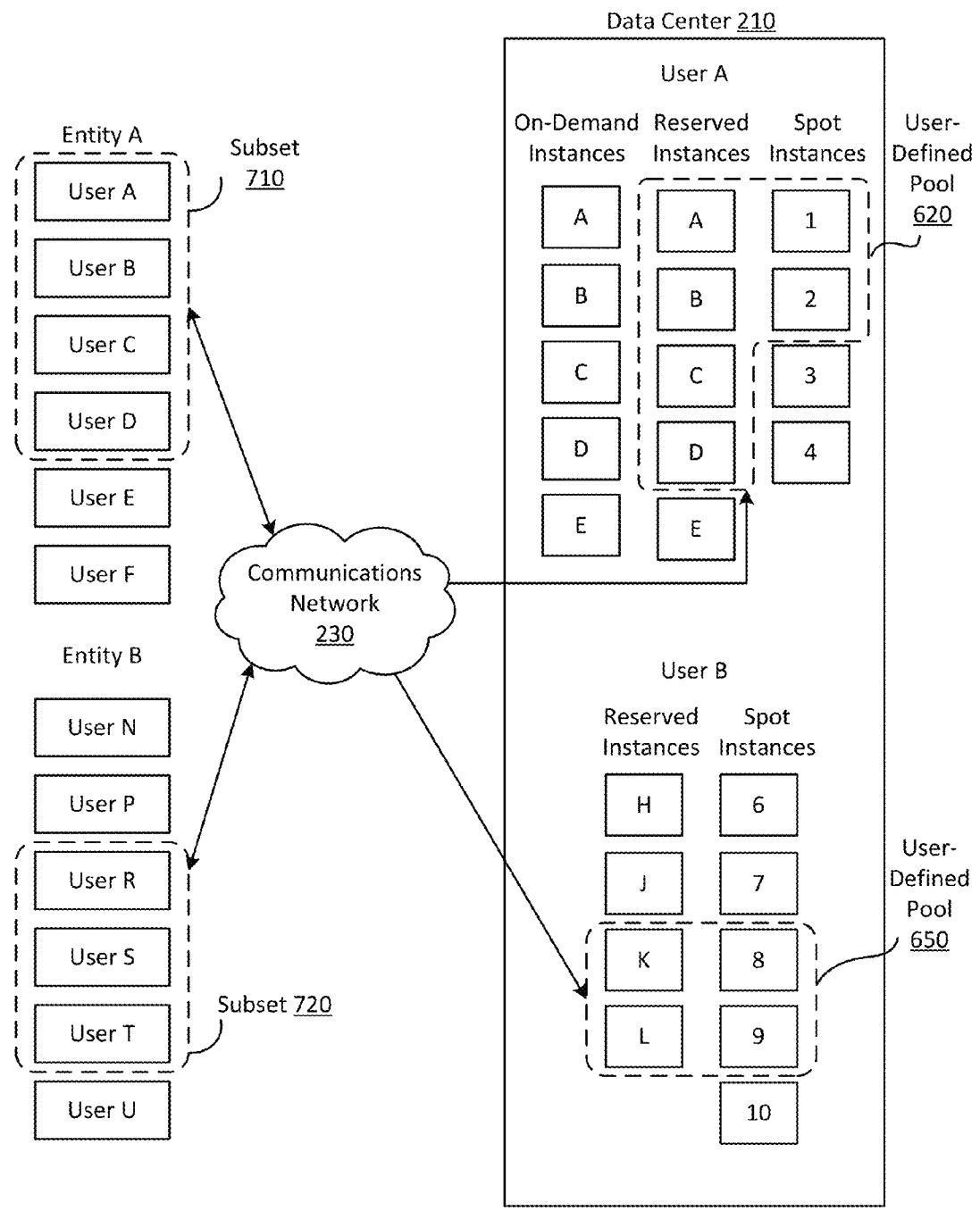
FIG. 7 is a diagram illustrating a system for pooling instances in accordance with the present disclosure.

Referring to FIG. 7, illustrated is an example showing entities allocating resources and users for a private marketplace in accordance with this disclosure. Entity A, who may correspond to entity A in FIG. 6, may have associated internal users A, B, C, D, E and F. Entity A may also have allocated reserved instances A, B, C and D of entity A's reserved instances in user-defined pool 620. Entity A may also allocate instances 1 and 2 of entity A's spot instances for the user-defined pool 620. Entity B may have associated internal users N, P, R, S, T and U. Entity B may also allocate instances K and L of entity B's reserved instances for user-defined pool 650. User B may also allocate instances 8 and 9 of user B's spot instances for the user-defined pool 650. Entity A may further authorize its internal users A, B, C, and D (subset 710) to access its user-defined pool 620. Entity B may further authorize its internal users R, S, and T (subset 720) to access its user-defined pool 650. The authorized internal users may now bid for access to the instances in their respective user-defined pools. Furthermore, entity A and entity B may elect to join resources and request that user-defined pool 620 and user-defined pool 650 be joined into a single user-defined pool. In one embodiment, users A, B, C, and D of entity A and users R, S, and T of entity B may bid for the combined single user-defined pool.

In some cases, the capacity of the resource slots allocated to a user-defined pool by a customer may be exceeded by the requests for the resource slots generated by the users. For example, a customer may underestimate the demand for resource slots and select a number of resource slots for the user-defined pool that is insufficient to meet the actual demand. In one embodiment, the provider network may provide an option for the customer to allow for such excess capacity demands to be met using unused capacity. For example, an option may be provided to fulfill the exceeded capacity using unused capacity that is already allocated to the customer but not allocated to the user-defined pool. As another example, an option may be provided to fulfill the exceeded capacity using unused capacity provided by the provider network. The provider network may charge a fee for the service. By providing such a capability, instead of rejecting user requests due to insufficient capacity, a customer may be able to continue providing access to the user-defined pool by accessing or "bursting" into additional capacity provided by the service provider or by the customer (using the customer's unused capacity) on an as-needed basis. Such a capability may be useful when peak demand occurs only on an occasional basis, in which case it may be more cost effective for the customer to purchase burst capacity rather than dedicate additional resource slots to the user-defined pool. In some embodiments, the decision as to whether excess capacity will be bursted from the provider network or from the customer's non-allocated capacity can be based on a policy selected by the customer. For example, the customer may specify a maximum price that the customer is willing to pay for excess capacity. The customer may also specify a maximum budget within which burst requests can be fulfilled until the maximum budget is reached.

Figure 8:
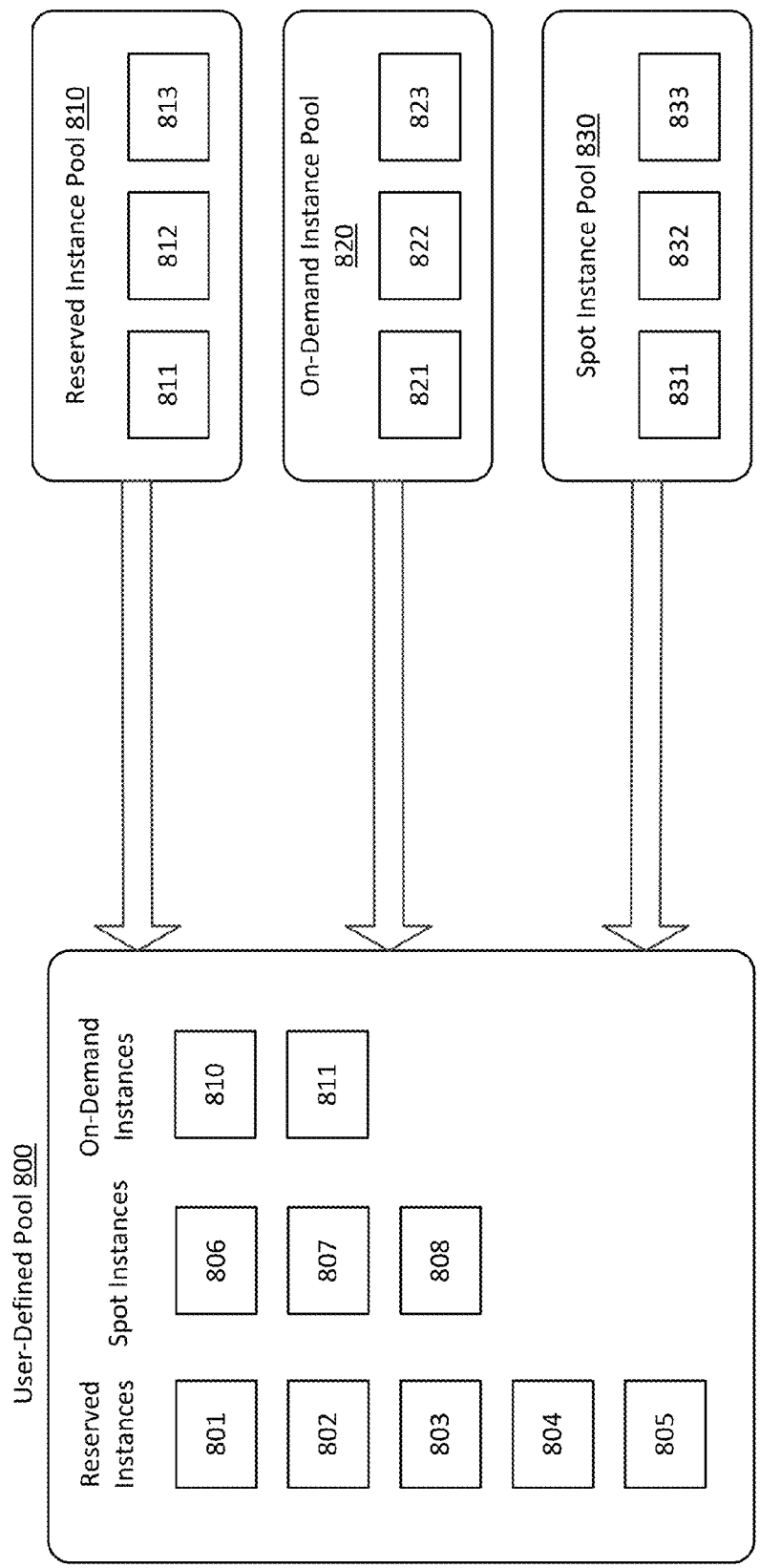
FIG. 8 is a diagram illustrating a system for bursting capacity in accordance with the present disclosure.

Turning to FIG. 8, illustrated is an example of a user-defined pool configured to access burst capacity. A user-defined pool 800 may include reserved instances 801, 802, 803, 804 and 805, as well as spot instances 806, 807 and 808. During periods of peak activity, user-defined pool 800 may receive more requests than can be provided using the resources allocated to the user-defined pool. In one embodiment, a policy may have been established that allows user-defined pool 800 to access reserved instance pool 810 for bursting capacity. For example, as shown in the figure reserved instance slots 811, 812 and 813 may be allocated to user-defined pool 800 for burst capacity. Similarly, the policy may allow user-defined pool 800 to access on-demand instance pool 820 including on-demand instances 821, 822 and 823, and spot instance pool 830, including spot instances 831, 832 and 833, for bursting capacity.

Figure 9:
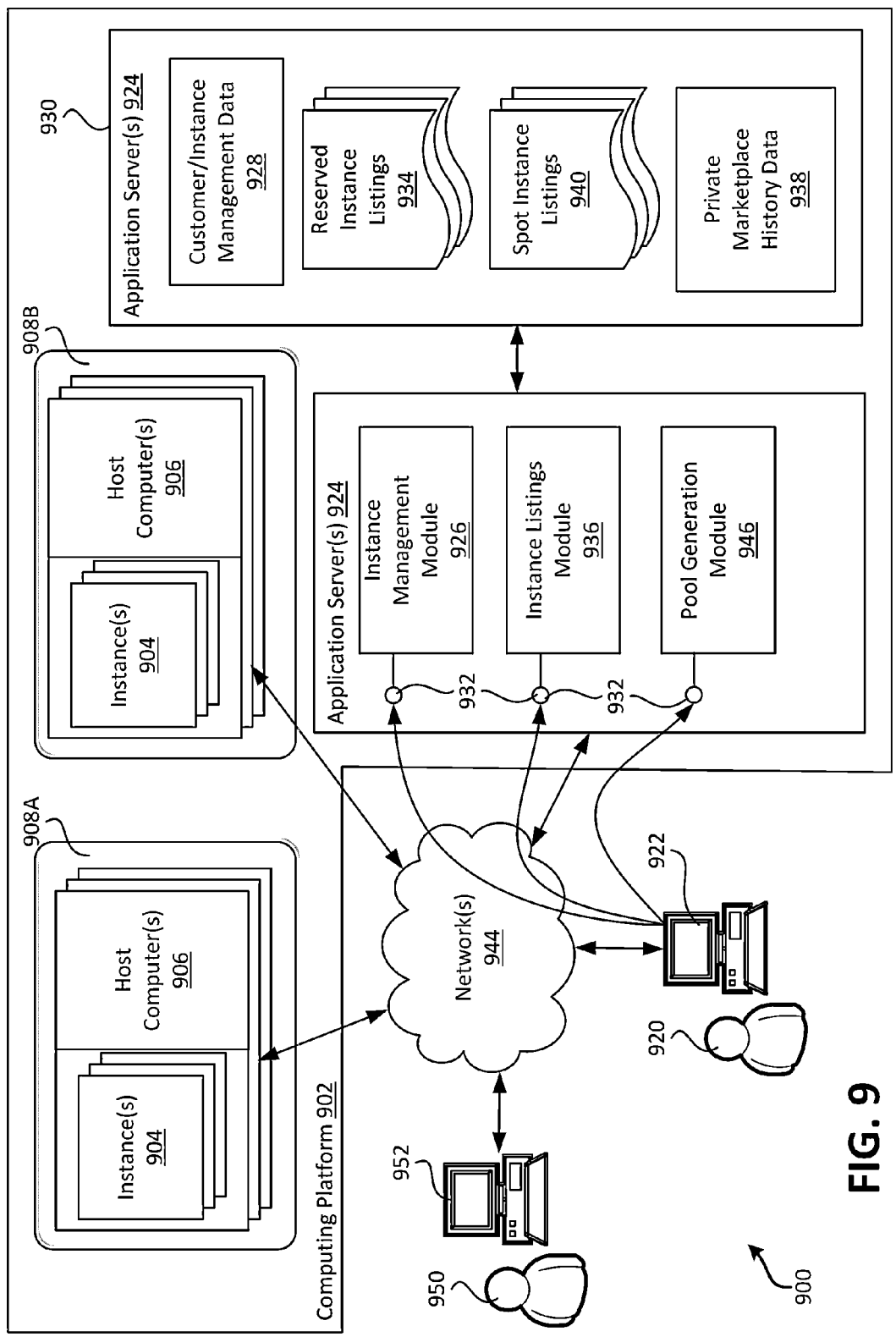
FIG. 9 is a diagram illustrating a system for pooling instances in accordance with the present disclosure.

FIG. 9 is a system diagram that shows an illustrative operating environment 900 including several components for implementing a private marketplace. The environment 900 may include a computing platform 902. The computing platform 902 may be implemented by a computing resource provider to make computing resources available to customers 920 for the deployment and execution of distributed applications.

The computing resources provided by the computing platform 902 may include various classes of resources, such as data processing resources, data storage resources, data communication resources and the like. Each class of computing resource may be general-purpose or may be available in a number of specific configurations. For example, data processing resources provided by the computing resource provider may be made available in discrete units or instances 904. Each instance 904 may represent the data processing resources of a dedicated host computer 906, referred to herein as a dedicated tenancy instance, or each instance 904 may represent a virtual machine instance executing on a host computer 906, which may also be referred to as a shared tenancy instance.

The host computers 906 may represent generic multi-processor server devices, special-purpose hardware devices and the like. As discussed above, various types and configurations of instances 904 may be made available. For example, each available instance 904 of data processing resources may be of a particular size—such as small, medium and large—representing different combinations of physical and/or virtual resources comprising or allocated to the instance, such as number and types of processors, amounts of memory, size and speed of local storage, number of networking addresses or communication channels and/or the like. An instance 904 may further be configured with a particular platform, such as a specific OS and/or hypervisor installed on the instance. Instances 904 may also be made available with specific application software components installed, such as Web server software, database management software, portal software, a specific runtime environment or platform and the like.

Instances may further be available in specific availability zones 908A and 908B, as described above. As discussed above, an availability zone 908 may represent a particular physical location, such as a data center, or other physical and/or logical grouping of underlying host computers 906 and computing devices supporting the instances 904 provided by the computing platform 902. Providing instances 904 in different sizes and in different availability zones 908 may allow a deployed application to be geographically dispersed, improving end-user performance and insulating the overall application from failures in one particular location or zone. For example, a customer 920 may choose to deploy a number of small instances 904 across multiple availability zones 908 for some functions of the application, such as Web servers, while deploying a single large instance 904 for other functions, such as a database server, for example. The customer 920 may also require that instances 904 be hosted by host computers 906 in particular geographical locations for geopolitical reasons, as well.

End-users 950 may utilize end-user computer systems 952 to access the functionality of the application executing on the allocated instances 904 through one or more networks 944. The network(s) 944 may represent a combination of local-area networks (LANs), wide-area networks (WANs), the Internet and/or any other networking infrastructure known in the art that connects the host computers 906 in the computing platform 902 to the end-user computer systems 952, to each other and to other computing resources. The end-user computer systems 952 may represent personal computers (PCs), desktop workstations, laptops, notebooks, personal digital assistants (PDAs), electronic-book readers, game consoles, set-top boxes, consumer electronics devices, server computers or any other computing device capable of connecting to the network(s) 944 and communicating with the host computers 906 in the computing platform 902.

A customer 920 wishing to access resources on the computing platform 902 may similarly utilize a customer computer system 922 to connect the computing platform over the network(s) 944 and to configure and manage the computing resources provided by the computing platform. In this regard, the computing platform 902 may include a number of application servers 924 that provide various management services to the customer 920 for purchasing and maintaining instances 904 of data processing and/or other computing resources, deploying components of the application across the purchased instances 904, monitoring and administering execution of the application and the like. As in the case of the end-user computer systems 952, the customer computer systems 922 may represent PCs, desktop workstations, laptops, notebooks, PDAs, electronic-book readers, game consoles, set-top boxes, consumer electronics devices, server computers or any other computing device capable of connecting to the network(s) 944 and communicating with the application servers 924 in the computing platform 902.

The application servers 924 may represent standard server computers, database servers, Web servers, network appliances, desktop computers, other computing devices and any combination thereof. The application servers 924 may execute a number of modules in order to provide the management services. The modules may execute on a single application server 924 or in parallel across multiple application servers in the computing platform 902. In addition, each module may consist of a number of subcomponents executing on different application servers 924 or other computing devices in the computing platform 902. The modules may be implemented as software, hardware or any combination of the two.

The application servers 924 may execute an instance management module 926. The instance management module 926 may allow customers 920 to purchase and configure instances 904 of data processing or other computing resources, manage and maintain purchased instances 904 and the like. Instances 904 may include instances that may be obtained through various modes such as reserved instances, spot instances and on demand instances as described above. Purchased instances 904 for each customer 920 and corresponding configuration and status information may be stored in customer/instance management data 928. The customer/instance management data 928 may be stored in a database 930 or other data storage system available to the application server(s) 924 in the computing platform 902.

Reserved instances provide the customer with the ability to reserve a number of a specific type and configuration of instances for a term, such as one year or three years. The reserved instances may represent actual instances of data processing resources configured as specified and placed in stand-by for launch and deployment by the customer 920 at a future time, or the reserved instances 904 may represent overall capacity reserved by the computing resource provider for quick configuration and launch when required. When deploying an application, a customer 920 may purchase and launch a number of on-demand instances 904 of a specific type and configuration (e.g., size, platform, tenancy, availability zone and the like) to support immediate availability of the application, as well as a number of reserved instances of the same or similar type and configuration for scaling up the application in the future in response to increased demand or capacity requirements of the application, for example.

A customer 920 may utilize a Web browser application executing on the customer computer system 922 to access a user interface (UI) presented by the instance management module 926 through a Web service to perform the configuration and maintenance of their purchased instances 904. The customer 920 may utilize a Web browser application executing on the customer computer system 922 to access a UI presented by the pool generation module 946 through a Web service to one or more of their purchased instances 904 as a user-defined pool as discussed above. Additionally or alternatively, the instance management module 926 or pool generation module 946 may expose an application programming interface (API) 932, which may be accessed over the network(s) 944 by stand-alone application programs executing on the customer computer system 922. Other mechanisms for accessing the configuration and maintenance services of the instance management module 926 or pool generation module 946 may also be imagined, including remote procedure calls, SOAP-based Web services, remote file access, proprietary client-server architectures and the like.

In some embodiments, the instance management module 926 may allow customers 920 to purchase both on-demand instances and reserved instances. On-demand instances may be purchased and launched immediately, allowing for quick deployment of the components of the application. On-demand instances may further be added or removed as needed, either manually or automatically through auto scaling, as demand for or capacity requirements of the application changes over time. The customer 920 may incur ongoing usage costs related to their on-demand instances, based on the number of hours of operation of the instances 904 and/or the actual resources utilized, for example.

A customer 920 may determine that their computing capacity may be more efficiently utilized if their instances 904 purchased at deployment of the application were offered to their internal users using a private purchase/bidding process via a private marketplace as described above. For example, the computation needs of the users of customer 920 may change over time, requiring data processing instances 904 of a different sizes or platforms at different times. Similarly, overall demand for the resources may change requiring more instances 904 or requiring instances in different availability zones 908 than originally anticipated. The customer 920 may wish to "sell" their instances 904 to their internal users in order to more efficiently utilize the computing capacity offered by their instances 904 and provide a greater return on the original investment in the purchased instances. In this regard, the pool generation module 946 may further allow the customer 920 to select a number of instances 904 to allocate to a private marketplace. The instance management module 926 may store information regarding the instance(s) 904 selected for the private marketplace in reserved instance listings 934 and spot instance listings 940 in the database 930 or other data storage system available to the application server(s) 924 in the computing platform 902.

In one embodiment, the customer 920 may delegate a number of instances 904 for a user-defined pool or private marketplace that is accessible to a set of internal users as designated by the customer 920. In one embodiment, the private marketplace may implement a private spot market that is configured to provide access to instances using some of the features used in spot markets as described above. However, the private marketplace may be limited to designated or internal users of the customer 920. Furthermore, the private marketplace may operate using a particularized set of parameters and features that are selected by the customer 920.

In one embodiment, the pool generation module 946 may allow customers 920 to purchase a user-defined pool or a private marketplace. User-defined pools may be purchased and launched to allow users designed by customers 920 to bid for instances that are allocated to the user-defined pool. User-defined pools may further be added or removed as needed by the customers 920, either manually or automatically through the use of policies. The customer 920 may incur one-time fees and/or ongoing usage costs related to their user-defined pools, based for example on the number of user-defined pools and the number of hours of operation of the user-defined pools and/or the actual resources utilized.

The application servers 924 may further execute an instance listings module 936. The instance listings module 936 may allow users identified by customer 920 to browse and bid for the instances 904 allocated for the private marketplace. A user of customer 920 may utilize a Web browser application executing on the customer computer system 922 to access a user interfaces (UI) presented by the instance listings module 936 through a Web service to browse and select instances 904 listed in the private marketplace for "purchase" or "bid." Additionally or alternatively, the instance listings module 936 may expose an API 932, which may be accessed over the network(s) 944 by stand-alone application programs executing on the customer computer system 922.

The instance listings module 936 may access the reserved instance listings 934 and spot instance listings 940 in the database 930 to determine availability and pricing for instances meeting specified type and configuration requirements (e.g., size, platform, tenancy, availability zone and the like). The instance listings module 936 may also effect allocation of the instances in the private marketplace. The reserved instance listings module 936 may further store data regarding each "sale" of the instances through the private marketplace in private marketplace history data 938 in the database 930 or other data storage system. The private marketplace history data 938 may be utilized by customer 920 or the computing resource provider to analyze billing data regarding the allocation of instances through the private marketplace.

In some embodiments, the customer 920 may utilize one or more of the above described modules to add additional types of instances as they become available. At least some of the above described functionality can be executed on one or more of the customer's instances, or can be executed on instances or other resources of the provider network.

Figure 10:
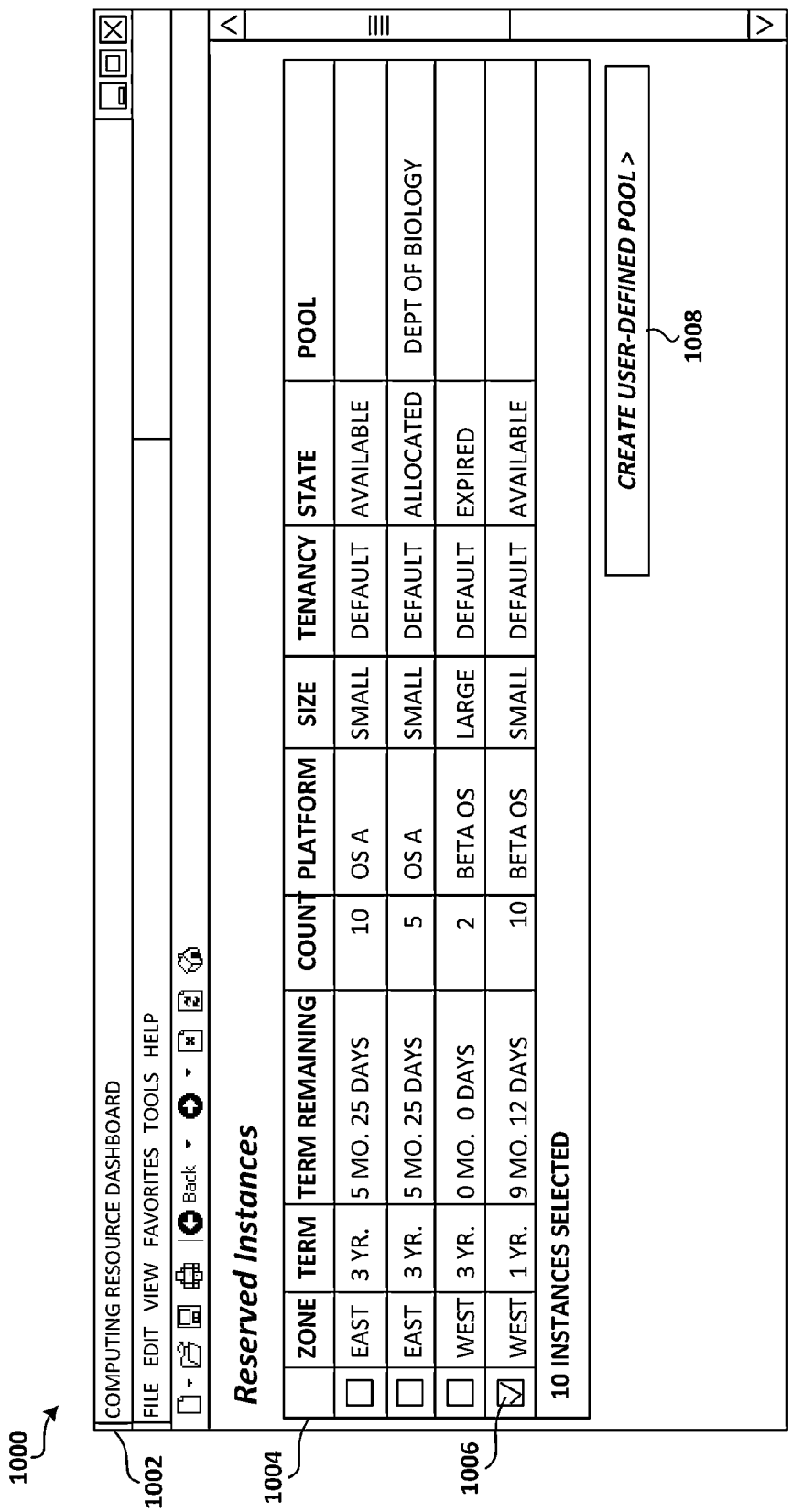
FIG. 10 is a diagram illustrating an example user interface in accordance with the present disclosure.

In one embodiment, the user can be provided a user interface for selecting one or more of the user's resource slots for the private marketplace and selecting associated parameters. For example, the user may be able to access a user interface, such as the one shown in FIG. 10. In one embodiment, a customer may utilize a UI presented by the instance management module 9926 of FIG. 9 to select the instances to be listed in a private marketplace. For example, as shown in FIG. 10, the instance management module 926 or another module in the cloud computing platform 902 may present the UI 100 to the customer 920 in a window 102 of a Web browser or other client application executing on the customer computer system 922. The UI 100 may include a reserved instance list 104 listing the reserved instances of instances 904 of FIG. 8 currently owned by the customer 920, including the type and configuration parameters of each, such as the availability zone, platform, size, tenancy and the like. The reserved instance list 104 may further include the original term of each reserved instance of instances 904 and the remaining term until the reserved instance expires. The reserved instance list 104 may also include the current state of the reserved instances of instances 904, such as whether the reserved instances are active, have expired, are already listed in a user-defined pool, the name of the user-defined pool if already listed and the like.

The UI 100 may further include a selection UI control, such as the checkbox UI control 106 shown in FIG. 9, that allows the customer 920 to select one or more reserved instances shown in the reserved instance list 104 for listing in the private marketplace, after which the customer 920 may select a command UI control, such as the create listing UI control 108 shown in FIG. 9. Other methods of selecting reserved instances of instances 904 for listing in the reserved instance marketplace through the UI 100 may also be implemented, including selecting a line in the reserved instance list 104 with a mouse or other input control and selecting a command UI control from a context menu presented by the instance management module 926 for the selected line, for example.

Figure 11:
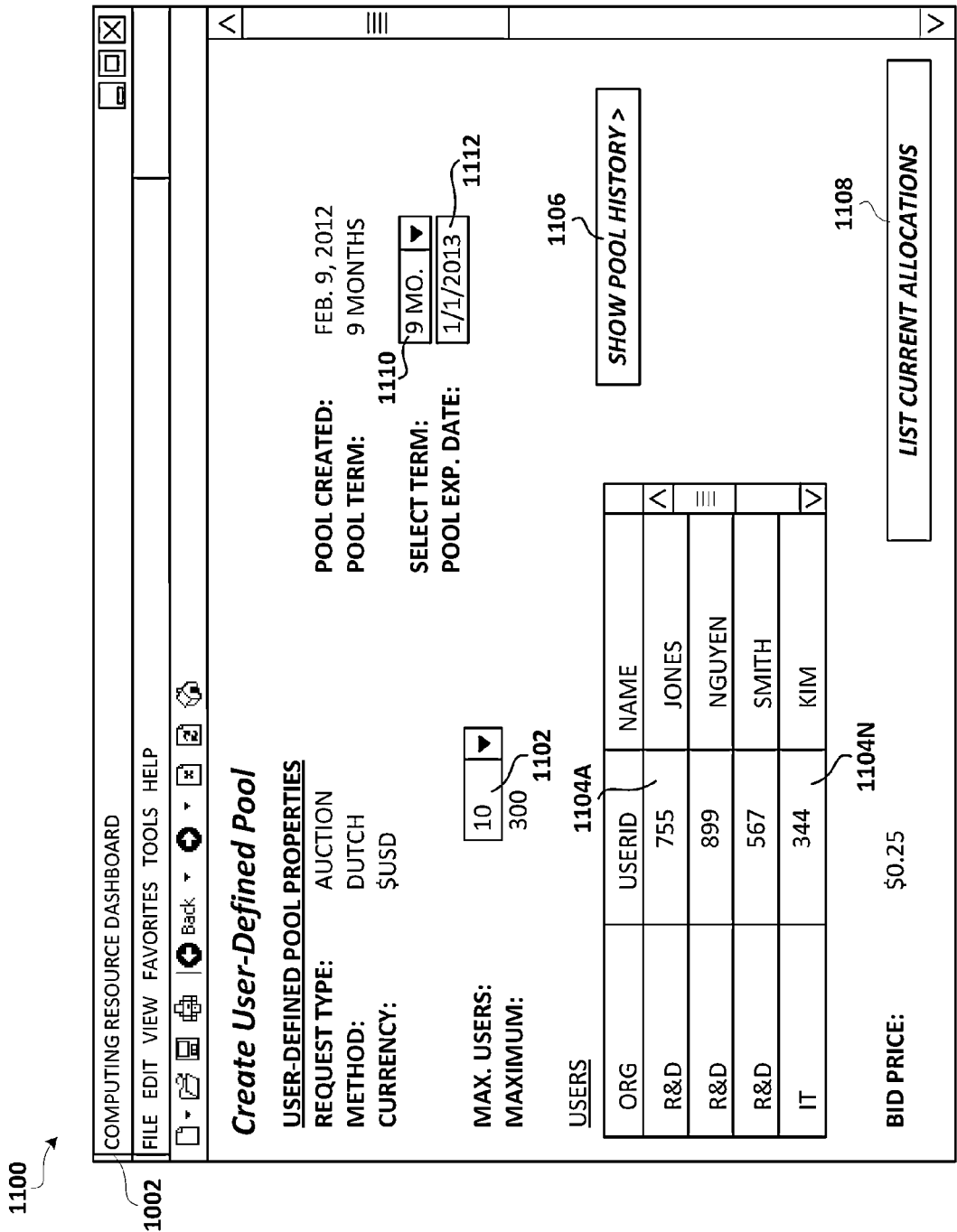
FIG. 11 is a diagram illustrating an example user interface in accordance with the present disclosure.

After selection of an option to create a private marketplace, instance management module 926 may receive information for the parameters for the private marketplace. For example, upon selecting the create user-defined pool UI control 118 in the UI 110 shown in FIG. 9, the instance management module 926 or another module in the cloud computing platform 902 may present the UI 1100 to the customer 820, as shown in FIG. 11. The UI 1100 may be presented in the window 1102 of a Web browser or other client application executing on the customer computer system 822, for example. The UI 1100 may include a summary of the private marketplace, including the private marketplace (user-defined pool) properties and bidding parameters (e.g., request type, bidding method, currency and the like). The UI 1100 may further include a user selection UI control 1102, allowing the customer 820 to select a maximum quantity of users who can participate in the private marketplace.

The UI 1100 may further include a number of entry UI controls 1104A-1104N, allowing the customer 920 to specify users who can participate in the private marketplace. According to one embodiment, the customer 920 may be able to list the specific identifier, name and organization for the users who can access the marketplace. These users may have been previously entered and stored as users associated with customer 920. The user information can be used to determine users who are authorized to bid for the resources in the private marketplace and can also be used to track usage for billing purposes. The customer 920 may also remove one or more users by deleting users using UI controls 1104A-1104N.

In some embodiments, an API may be provided for facilitating the creation and management of user-defined pools. The API may be configured to receive electronic messages that encode identifiers indicative of requests for allocating computing resources in a provider network and creating a user-defined pool of the computing resources. In response to receiving one of the electronic messages, the API may send second electronic messages indicative of information indicating that a set of resource slots associated with a customer is associated with a pricing policy and one or more users designated for the user-defined pool.

Figure 12:
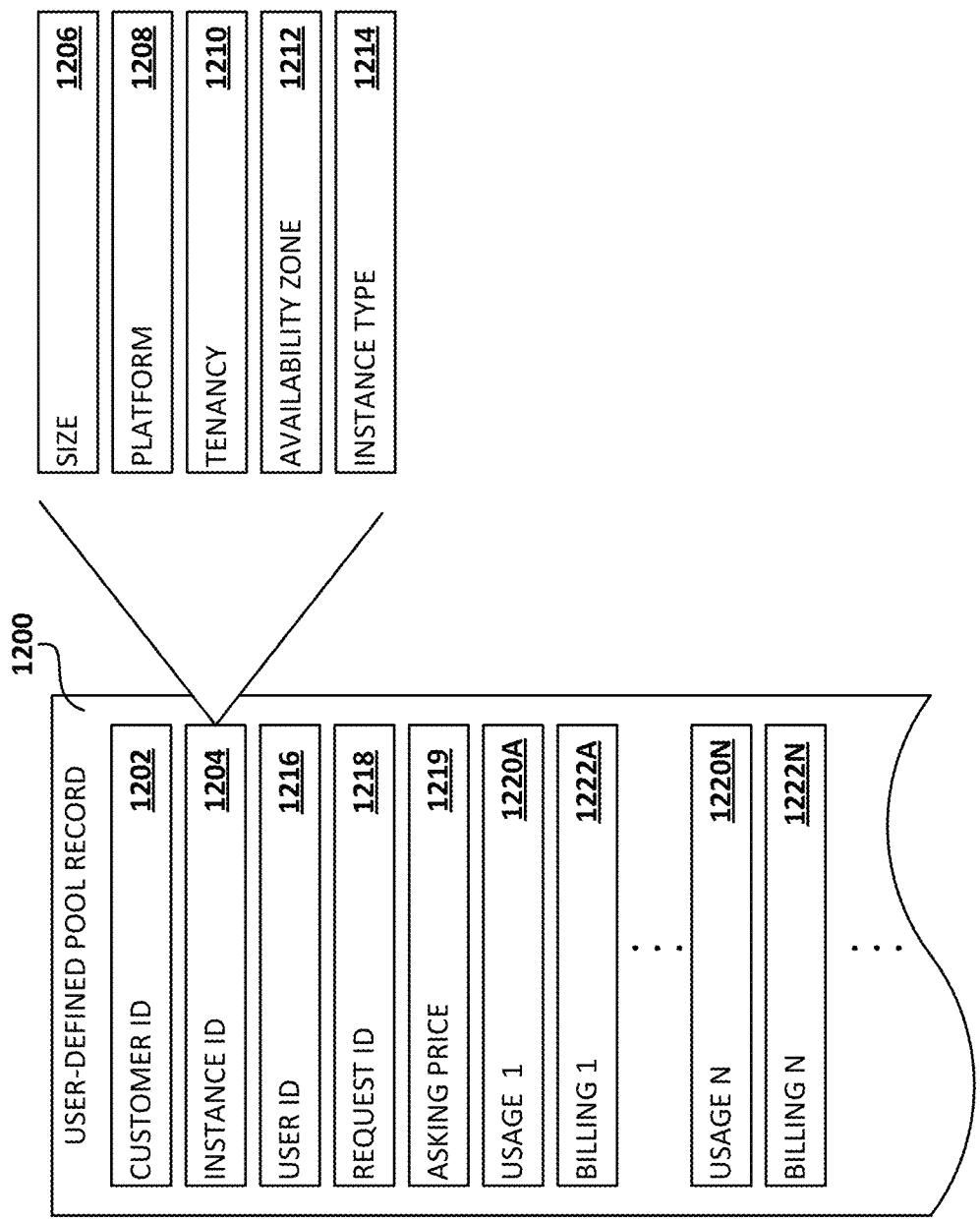
FIG. 12 is a diagram illustrating an example data record in accordance with the present disclosure.

FIG. 12 is a data structure diagram showing a number of data elements stored in a user-defined pool record 1200 regarding a user-defined pool. It will be appreciated by one skilled in the art that the data structure shown in the figure may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice and may depend on the technology, performance and other requirements of the computing system upon which the data structures are implemented.

Each user-defined pool record 1200 may contain a customer ID 1202 identifying the customer 820 of the cloud computing platform 802 that is creating the private marketplace. According to one embodiment, each user-defined pool record 1200 may also contain an instance ID 1204 identifying the specific instance 804 that may be associated with a bid request. The instance ID 1204 may correspond to information regarding the instance 104 stored in the customer/instance management data 828, for example. In this embodiment, each instance 104, which is to be included in the private marketplace, may have an associated user-defined pool record 1200 in the database 830.

In some embodiments, the user-defined pool record 1200 may additionally or alternatively contain the type and configuration parameters describing the associated instance(s) 1204, including the size 1206, platform 1208, tenancy 1210, availability zone 1212, instance type 1214 and the like. The user-defined pool record 1200 may also contain a user ID 1216 indicating an identification of a particular user associated with the record. The user ID 1216 may correspond to the identifier information provided by the customer 820 when creating the user-defined pool, as described above with regard to FIG. 10.

The user-defined pool record 1200 may also contain information regarding a request ID 1218, corresponding to a particular request for an instance, and asking price 1219 that corresponds to the bid amount for the request. The user-defined pool record 1200 may further contain information regarding one or more usage records 1220A-1220N (also referred to herein generally as "usage 1220") and billing records 1222A-1222N (also referred to herein generally as "billing 1222"). As further discussed above in regard to FIG. 10, a user may access an instance after successfully bidding for the instance in the private marketplace. Billing records 1222A-1222N for usage 1220A-1202N may be tracked for the user for billing purposes. It will be appreciated that the user-defined pool record 1200 may contain additional data elements beyond those shown in FIG. 12 and described above that are utilized by the instance management module 926, the instance listings module 936 and/or other modules of the cloud computing platform 902 implementing the private marketplace.

In additional embodiments, the instance management module 9926 or other modules in the cloud computing platform 0902 may provide UIs or APIs 932 to the customer 920 and/or customer computer system 9922 that allow the customer to modify their user-defined pool, check the status of the user-defined pool and/or to delete the user-defined pool if it is no longer desired to provide the instances using the user-defined pool delivery mechanism.

Figure 13:
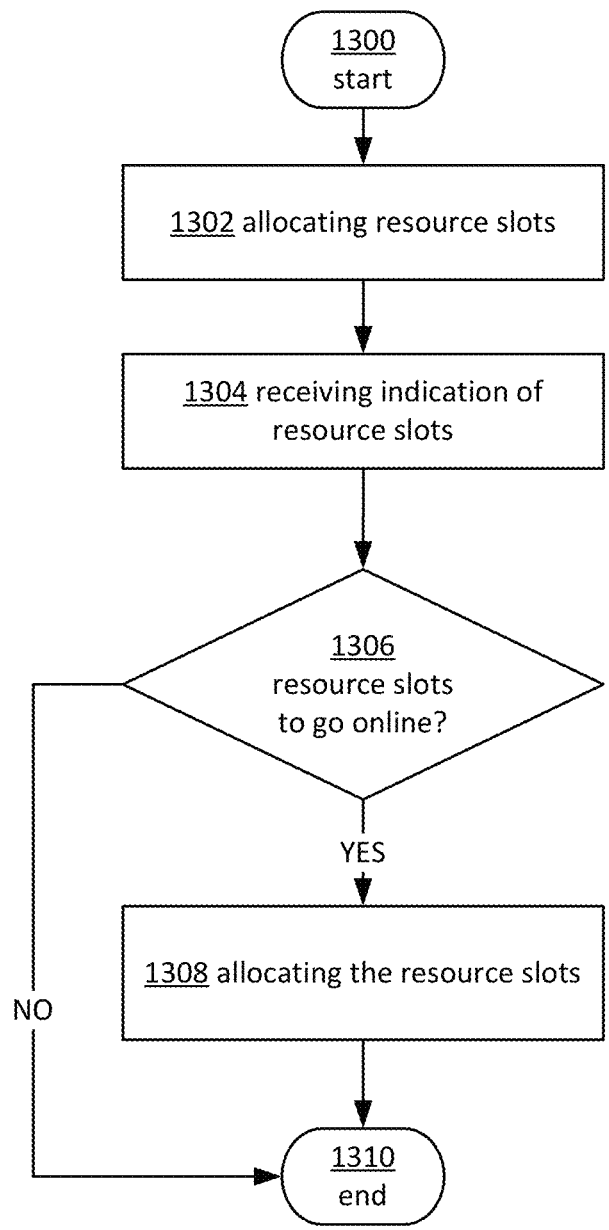
FIG. 13 is a flowchart depicting an example procedure for pooling instances in accordance with the present disclosure.

FIG. 13 illustrates an example operational procedure for allocating computing resources in a provider network. In an embodiment, a mechanism for creating a user-defined pool can be provided by services such as user-defined pool generation service 180 in FIG. 1. The operational procedure may be implemented in a system comprising one or more computing devices. The one or more computing devices may comprise a plurality of resource slots, each resource slot configured to host a computing instance. Referring to FIG. 13, operation 1300 begins the operational procedure. Operation 1300 may be followed by operation 1302. Operation 1302 illustrates allocating a plurality of resource slots to a plurality of entities according to a first pricing policy. The entities may correspond to customers or users of the provider network, such as a university or other institution. The first pricing policy may be the pricing policies used by the provider network to sell and allocate resource slots and other resources in the provider network.

Operation 1302 may be followed by operation 1304. Operation 1304 illustrates receiving an indication that at least one of the resource slots associated with a first entity of the plurality of entities is associated with a second pricing policy. The indicated resource slots may be accessible to other entities. In one embodiment, the second pricing policy and the other entities may be designated by the first entity. The subset may correspond to a group of resource slots designated by a customer to allocate to a private marketplace. The second pricing policy may correspond to user-selected policies for offering the resource slots to the other entities. The other entities may correspond to the users designated by the customer who can access the resource slots in the private marketplace.

Operation 1304 may be followed by operation 1306. Operation 1306 illustrates determining that the first entity has indicated that the indicated resource slots should be brought online.

If the indicated resource slots should be brought online, then operation 1306 may be followed by operation 1308—which illustrates allocating the indicated resource slots to the other entities according to the second pricing policy.

Figure 14:
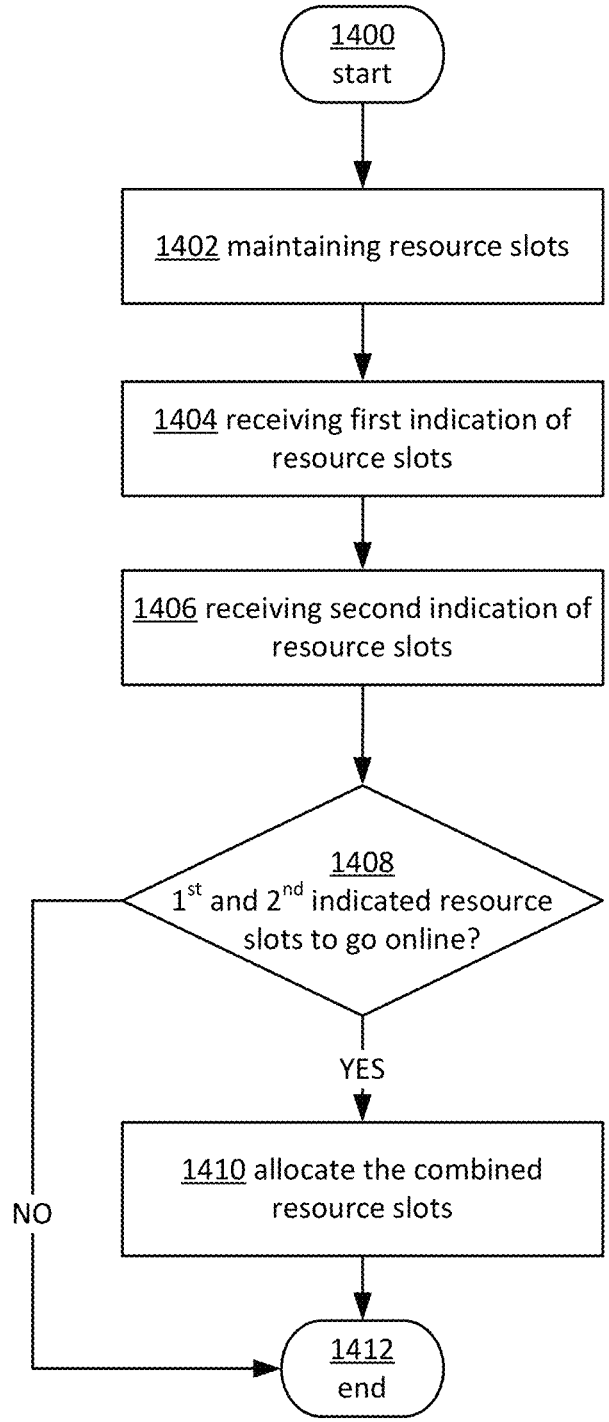
FIG. 14 is a flowchart depicting an example procedure for pooling instances in accordance with the present disclosure.

FIG. 14 illustrates an example operational procedure for allocating computing resources in a provider network. In an embodiment, a mechanism for allocating computing resources can be provided by services such as the user-defined pool generation service 180 in FIG. 1. The operational procedure may be implemented in a system comprising one or more computing devices. The one or more computing devices may comprise a plurality of resource slots, each resource slot configured to host a computing instance. Referring to FIG. 14, operation 1400 begins the operational procedure. Operation 1400 may be followed by operation 1402. Operation 1402 illustrates maintaining a plurality of resource slots allocated to a plurality of entities according to a first pricing policy.

Operation 1402 may be followed by operation 1404. Operation 1404 illustrates receiving a first indication that one or more of the resource slots associated with a first entity of the plurality of entities is associated with a second pricing policy and accessible to a grouping of other entities.

Operation 1404 may be followed by operation 1406. Operation 1406 illustrates receiving a second indication that one or more of the resource slots associated with a second entity of the plurality of entities is associated with the second pricing policy and accessible to the grouping of other entities.

Operation 1406 may be followed by operation 1408. Operation 1408 illustrates determining that the or more of the resource slots associated with the first entity and one or more of the resource slots associated with the second entity should be combined and brought online. If the resource slots should be brought online, then operation 1408 may be followed by operation 1410—which illustrates combining the or more of the resource slots associated with the first entity and one or more of the resource slots associated with the second entity and allowing the grouping of other entities to bid for the combined resource slots according to the second pricing policy.

Figure 15:
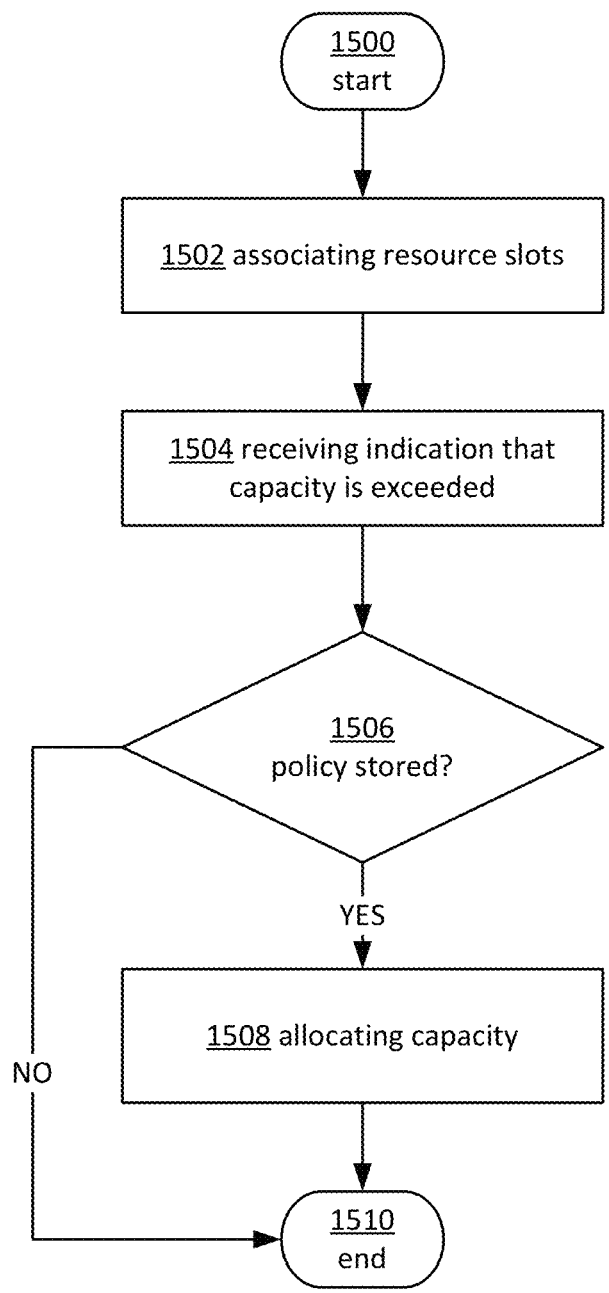
FIG. 15 is a flowchart depicting an example procedure for pooling instances in accordance with the present disclosure.

FIG. 15 illustrates an example operational procedure for allocating computing resources in a provider network. In an embodiment, a mechanism for creating a user-defined pool can be provided by services such as the user-defined pool generation service 180 in FIG. 1. The operational procedure may be implemented in a system comprising one or more computing devices. The one or more computing devices may comprise a plurality of resource slots, each resource slot configured to host a computing instance. Referring to FIG. 15, operation 1500 begins the operational procedure. Operation 1500 may be followed by operation 1502. Operation 1502 illustrates associating one or more resource slots with a designated group of users who are allowed to request access to the one or more resource slots according to a user-selected pricing policy. In one embodiment, the one or more resource slots may be selected from resource slots associated with an entity according to a provider-selected pricing policy.

Operation 1502 may be followed by operation 1504. Operation 1504 illustrates receiving an indication that a request for access to the one or more resource slots has been received that exceeds a computing capacity of the one or more resource slots.

Operation 1504 may be followed by operation 1506. Operation 1506 illustrates determining that a policy is stored for allocating excess computing capacity requests for the one or more resource slots.

If a policy is stored for allocating excess computing capacity requests for the one or more resource slots, then operation 1506 may be followed by operation 1508—which illustrates allocating additional computing capacity to allow fulfillment of the request for access.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for allocating computing resources in a provider network, the system comprising:
   one or more computing devices, the one or more computing devices comprising one or more resource slots, each resource slot configured to host a computing instance; and
   at least one memory having stored therein computer-readable instructions that, upon execution by one or more processors of the system, at least cause the system to:
   allocate a plurality of resource slots to a first user according to an allocation policy of the provider network;
   allow the first user to allocate at least a portion of the plurality of resource slots to a second user who is authorized to access and use the allocated portion according to an allocation policy established by the first user, wherein the allocation policy established by the first user is different from the allocation policy of the provider network,
   wherein the provider network is configured to deny requests to access the allocated portion of the plurality of resource slots not authorized by the allocation policy established by the first user; and
   maintain the allocation of the plurality of resource slots to the first user according to the allocation policy of the provider network while the allocated portion is accessed by the second user according to the allocation policy established by the first user;
   wherein the allocation policy established by the first user comprises:
   allowing the second user to submit a bid including a bid amount and a request for resource slots;
   comparing the bid amount with a settable minimum amount of the allocation policy established by the first user; and
   conditionally allocating one or more resource slots to the second user while the bid amount remains above the settable minimum amount.

2. The system according to claim 1, further comprising computer-readable instructions that, upon execution by the one or more processors of the system, cause the system to at least allow the second user to bid for indicated resource slots in accordance with the allocation policy established by the first user.

3. The system according to claim 2, further comprising computer-readable instructions that, upon execution by the one or more processors of the system, cause the system to at least provide a user interface for allowing the second user to bid for the indicated resource slots.

4. The system according to claim 2, further comprising computer-readable instructions that, upon execution by the one or more processors of the system, cause the system to at least provide a user interface for facilitating selection of the indicated resource slots, the second user, and the allocation policy established by the first user.

5. A method for allocating computing resources in a provider network, the method comprising:
   in a computing environment comprising a plurality of computing devices and where capacity of the computing devices are logically segmented into one or more resource slots, associating a plurality of resource slots with a first user according to an allocation policy of the provider network; and
   allowing the user to identify one or more of the associated resource slots and indicate other users allowed to access the one or more of the associated resource slots according to an allocation policy determined by the user, wherein the allocation policy determined by the user is different from the allocation policy of the provider network, and wherein the provider network is configured to deny requests to access the identified resource slots not authorized by the allocation policy determined by the user;
   wherein the allocation policy determined by the user comprises:
   allowing the other users to submit bids including a bid amount and a request for resource slots;
   comparing a given bid amount with a settable minimum amount of the allocation policy determined by the first user; and
   conditionally allocating one or more resource slots to a given one of the other users while the given bid amount remains above the settable minimum amount.

6. The method of claim 5, further comprising providing a user interface operable to receive indication of the one or more of the associated resource slots, the other users allowed to access the one or more of the associated resource slots, and the allocation policy determined by the user.

7. The method of claim 5, wherein the allocation policy determined by the user indicates currency for acquiring a resource slot, minimum/maximum currency levels, or a bidding algorithm.

8. The method of claim 7, wherein the currency relates to monetary units.

9. The method of claim 7, wherein the currency relates to CPU cycles, storage, memory, or network bandwidth.

10. The method of claim 5, wherein said bid comprises bidding for CPU cycles or network bandwidth.

11. The method of claim 5, further comprising allowing the user to disallow some of the other users from accessing the one or more of the associated resource slots.

12. The method of claim 5, wherein said allowing comprises receiving a request to allocate the one or more of the associated resource slots, associating the request with a request identifier, and associating the one or more of the associated resource slots with a pool identifier.

13. The method of claim 5, further comprising determining billing information for accessing the one or more of the associated resource slots.

14. The method of claim 5, further comprising determining which of the other users have bid for at least one of the one or more of the associated resource slots in accordance with the allocation policy determined by the user and collecting billing information based on the determining.

15. The method of claim 14, further comprising associating the determined other users with user identifiers and including the user identifiers with records associated with the determined other users.

16. The method of claim 15, wherein the records are formed as key value pairs.

17. The method of claim 5, wherein the bid comprises a maximum price to be paid for one or more of the associated resource slots.

18. The method of claim 17, wherein one of the one or more of the associated resource slots is allocated to one of the other users when the maximum price exceeds a predetermined price.

19. The method of claim 18, wherein the predetermined price is based on supply and demand of the one or more of the associated resource slots.

20. The method of claim 19, wherein the predetermined price is selectable by the user.

21. A non-transitory computer-readable storage medium having stored thereon computer-readable instructions, the computer-readable instructions comprising instructions that upon execution on one or more computing devices, to at least:

in a computing environment comprising a plurality of computing devices and where capacity of the computing devices are logically segmented into one or more resource slots, generate a user interface allowing a user to identify one or more resource slots associated with the user and select other users allowed to access the one or more resource slots associated with the user according to an allocation policy determined by the user, wherein a provider network is configured to deny requests to access the identified resource slots not authorized by the allocation policy determined by the user; and cause the computing environment to at least allow the other users to request the one or more resource slots associated with the user in accordance with the allocation policy determined by the user;

wherein the allocation policy determined by the user comprises:

allowing the other users to submit bids including a bid amount and a request for resource slots;

comparing a given bid amount with a settable minimum amount of the allocation policy determined by the first user; and conditionally allocating one or more resource slots to a given one of the other users while the given bid amount remains above the settable minimum amount.

22. The non-transitory computer-readable storage medium of claim 21, wherein the allocation policy determined by the user comprises currency to use to acquire a resource slot, price levels, or a bidding algorithm.

23. The non-transitory computer-readable storage medium of claim 22, wherein the bidding algorithm comprises one of an ascending auction and a descending auction.

24. The non-transitory computer-readable storage medium of claim 21, comprising instructions that upon execution on one or more computing devices, at least cause determining billing information for allowing the other users to bid for the one or more resource slots associated with the user.

25. The non-transitory computer-readable storage medium of claim 24, comprising instructions that upon execution on one or more computing devices, at least cause determining which of the other users have bid for one or more of the one or more resource slots associated with the user in accordance with the allocation policy determined by the user and determining billing information based on the determined other users.

* * * * *